(12) United States Patent
Chang et al.

(10) Patent No.: US 12,109,774 B2
(45) Date of Patent: Oct. 8, 2024

(54) HEEL CAP MANUFACTURING METHOD AND MANUFACTURING EQUIPMENT

(71) Applicant: DAH SHENG CHEMICAL INDUSTRY CO., LTD., Taichung (TW)

(72) Inventors: Heng-Tai Chang, Taichung (TW); Yu-Che Shen, Taichung (TW); Thi Bich Van Chung, Taichung (TW)

(73) Assignee: DAH SHENG CHEMICAL INDUSTRY CO., LTD., Taichung (TW)

( * ) Notice: Subject to any disclaimer, the term of this patent is extended or adjusted under 35 U.S.C. 154(b) by 334 days.

(21) Appl. No.: 17/491,620

(22) Filed: Oct. 1, 2021

(65) Prior Publication Data
US 2023/0068828 A1     Mar. 2, 2023

(30) Foreign Application Priority Data

Aug. 31, 2021   (TW) ................................ 110132334

(51) Int. Cl.
| | |
|---|---|
| *B29D 35/12* | (2010.01) |
| *A43B 21/00* | (2006.01) |
| *B29C 33/02* | (2006.01) |
| *B29C 43/52* | (2006.01) |
| *B29D 35/14* | (2010.01) |
| *B29L 31/50* | (2006.01) |

(52) U.S. Cl.
CPC ............ *B29D 35/124* (2013.01); *A43B 21/00* (2013.01); *B29C 33/02* (2013.01); *B29C 43/52* (2013.01); *B29D 35/144* (2013.01); *B29L 2031/502* (2013.01)

(58) Field of Classification Search
None
See application file for complete search history.

(56) References Cited

FOREIGN PATENT DOCUMENTS

| | | | | |
|---|---|---|---|---|
| CN | 113681958 A | * | 11/2021 | |
| CN | 115723368 A | * | 3/2023 | ............. A43B 21/00 |

OTHER PUBLICATIONS

Machine translation of CN-113681958-A (Year: 2021).*
Machine translation of CN-115723368-A (Year: 2023).*

* cited by examiner

*Primary Examiner* — Robert J Grun
(74) *Attorney, Agent, or Firm* — Muncy, Geissler, Olds & Lowe, P.C.

(57) ABSTRACT

A heel cap manufacturing method includes the steps of: a) preparing a multilayer composite material; b) performing the first time of molding by thermal pressing to the multilayer composite material by a thermal pressing device to obtain a thermal pressed semi-product; c) taking out the thermal pressed semi-product from the thermal pressing device and fixing it to a heel cap mold; d) performing the second time of molding by cold pressing to the thermal pressed semi-product together with the heel cap mold in a cooling device to obtain a cooled semi-product; and e) demolding and rewarming the cooled semi-product to obtain a finished heel cap. The present invention uses the processing manner of molding twice by cold and thermal pressing to manufacture the structurally more complex heel cap, effectively lowering difficulty of the manufacturing process and raising production efficiency. A heel cap manufacturing equipment is also provided.

7 Claims, 5 Drawing Sheets

HEEL CAP MANUFACTURING METHOD AND MANUFACTURING EQUIPMENT

BACKGROUND OF THE INVENTION

1. Field of the Invention

The present invention relates to shoes and more particularly, to a manufacturing method of a heel cap, and a manufacturing equipment for the heel cap.

2. Description of the Related Art

In the manufacture of general shoes, in order to maintain their shape for wear, the heel portion is usually structurally strengthened to avoid deformation problems. In the traditional heel cap manufacturing method, cardboard is taken as the base material, then the cardboard is covered in foam material or fabric in a sewing manner and at last bent with the required arc. However, the above-described traditional manufacturing method can be only used to manufacture the heel cap relatively simpler in structure. If it is required to manufacture a heel cap with a relatively more complex structure, the manufacturing process will be relatively higher in complexity and low in stability, so as to affect product yield and production capacity.

SUMMARY OF THE INVENTION

It is a primary objective of the present invention to provide a heel cap manufacturing method for manufacturing a heel cap with a relatively more complex structure by molding twice in cold pressing and thermal pressing manners, and it is effective in lowering the difficulty of the manufacturing process and raising the production efficiency.

To attain the above primary objective, the heel cap manufacturing method of the present invention includes the steps of: a) preparing a multilayer composite material; b) performing thermal press molding to the multilayer composite material by a thermal pressing device to obtain a thermal pressed semi-product; c) taking out the thermal pressed semi-product from the thermal pressing device and then fixing it to a heel cap mold; d) performing cold press molding to the thermal pressed semi-product together with the heel cap mold in a cooling device to obtain a cooled semi-product; and e) demolding the cooled semi-product from the heel cap mold, and after it is rewarmed, obtaining a finished heel cap.

It can be known from the above-described heel cap manufacturing method that the present invention uses the processing manner of molding twice by cold and thermal pressing to manufacture the multilayer composite material into the heel cap, which can lower the difficulty of the manufacturing process and bring high stability, raising both the product yield and the production efficiency.

Preferably, in the step d), a refrigerator is used as the cooling device, which can raise the production capacity, lower humidity and reduce moisture.

Preferably, in the step e), a rewarming device, such as air-drying machine or thermal drying machine, is used to rewarm the cooled semi-product.

Preferably, the heel cap manufacturing method further includes a step of cutting and modifying the edge of the finished heel cap.

Preferably, in the step a), an auxiliary jig is used to press a lower surface material, at least two middle materials and an upper surface material together in order, making them sticked to each other to form the multilayer composite material.

Preferably, in the step a), the lower surface material, the at least two middle materials and the upper surface material are firstly applied on single or double surfaces thereof with glue, and then combined into the multilayer composite material by the auxiliary jig.

Preferably, in the step a), after the multilayer composite material is formed by the auxiliary jig, the multilayer composite material is sent into a stove to be dried for solidifying the glue.

Besides, it is another objective of the present invention to provide a manufacturing equipment for the above-described heel cap, which can not only lower the difficulty of the manufacturing process and raise the production efficiency, but also enable the diversity in appearance shaping.

To attain the aforementioned another objective, the present invention provides a heel cap manufacturing equipment which includes a thermal pressing device, a heel cap mold, a cooling device, and a rewarming device. The thermal pressing device performs thermal press molding to the multilayer composite material to form the multilayer composite material into the thermal pressed semi-product, and this is the first time of molding. The heel cap mold detachably fixing the thermal pressed semi-product. The cooling device performs cool press molding to the thermal pressed semi-product together with the heel cap mold so as to form the thermal pressed semi-product into the cooled semi-product, and this is the second time of molding. The rewarming device rewarms the cooled semi-product, so that the cooled semi-product after rewarmed is formed into the finished heel cap.

Preferably, the thermal pressing device has a thermal pressing mold. The thermal pressing mold has a positioning pillar. The multilayer composite material has at least one positioning hole. The positioning pillar of the thermal pressing mold is inserted in the positioning hole of the multilayer composite material, so that the multilayer composite material can positively maintain positioned during the thermal press molding.

Preferably, the heel cap manufacturing equipment further includes an edge trimming device. The edge trimming device performs cutting and modifying to the edge of the finished heel cap.

Preferably, the heel cap mold uses two elastic bands to fix the thermal pressed semi-product to avoid too deep impressions left on the thermal pressed semi-product.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
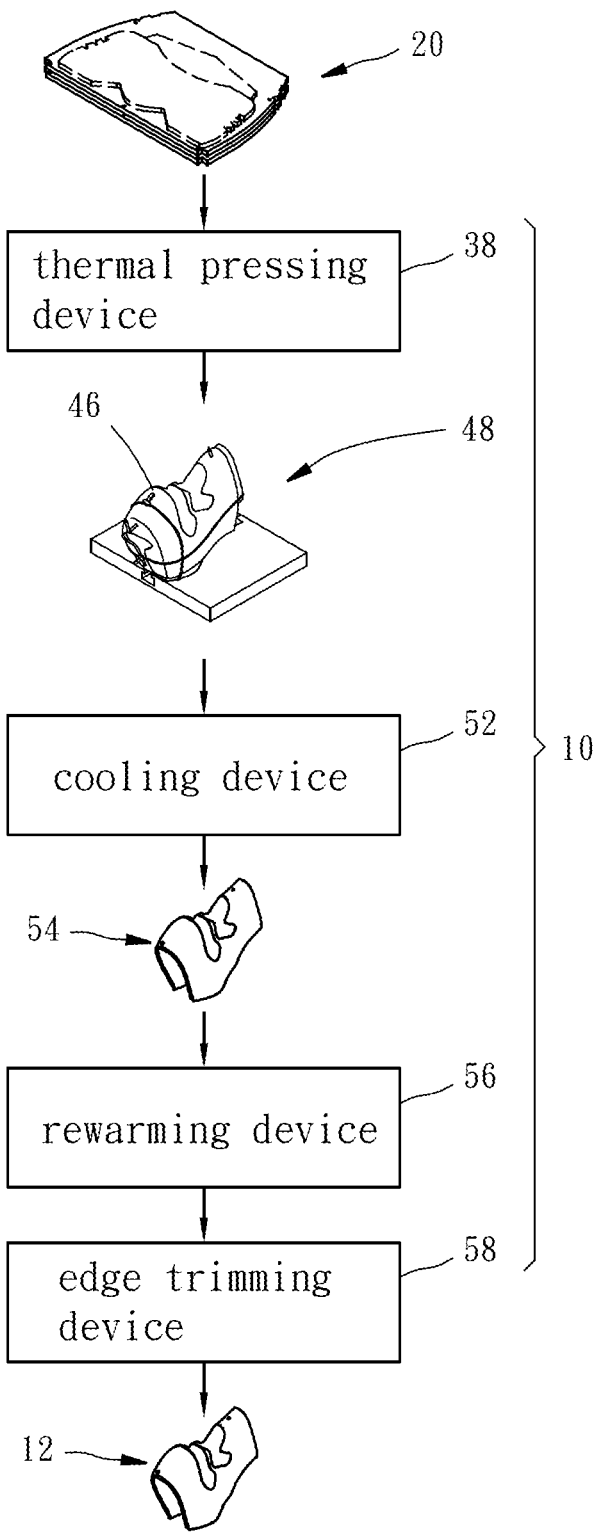
FIG. 1 is a schematic flow diagram of a heel cap manufacturing method of the present invention.

First of all, it is to be mentioned that throughout this specification, including the following embodiment and claims, the directional terms are all based on the direction shown in the figures. Besides, same reference numerals used in the following embodiment and the appendix drawings designate same or similar elements or the structural features thereof.

Referring to FIG. 1, a schematic view of the structure of a manufacturing equipment 10 for a heel cap 12 provided by the present invention is shown in FIG. 1. A manufacturing method for the heel cap 12 provided by the present invention will be specified in the following, and the technical features of the aforementioned manufacturing equipment 10 will be specified at the same time.

Figure 2:
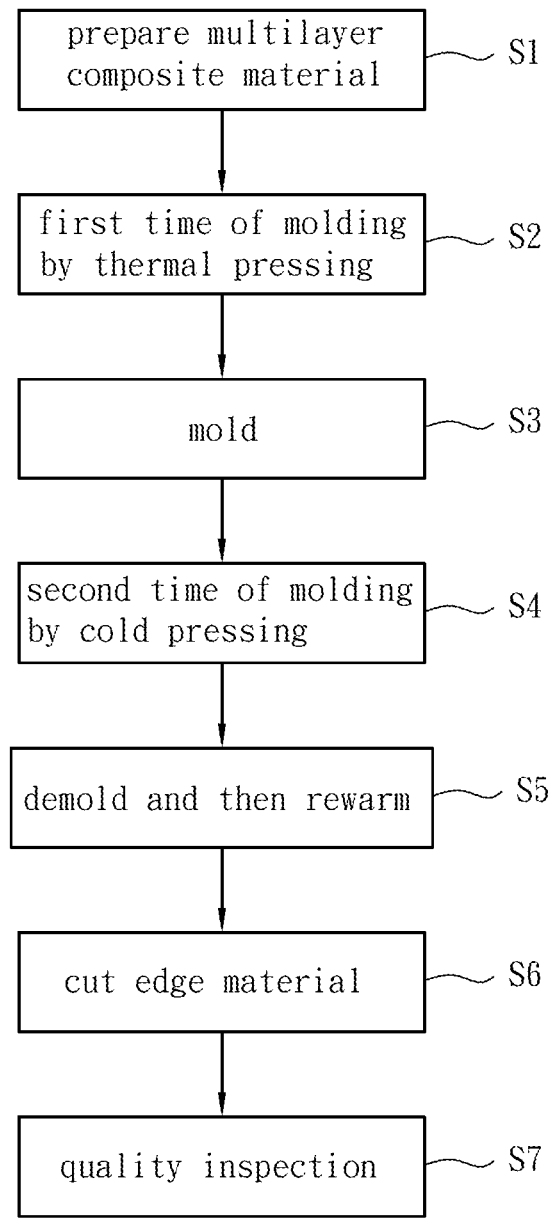
FIG. 2 is a block diagram of the heel cap manufacturing method of the present invention.

As shown in FIG. 2, the manufacturing method of the heel cap 12 of the present invention includes the following steps.

a) As the step S1 shown in FIG. 2, a multilayer composite material 20 is prepared.

Figure 3:
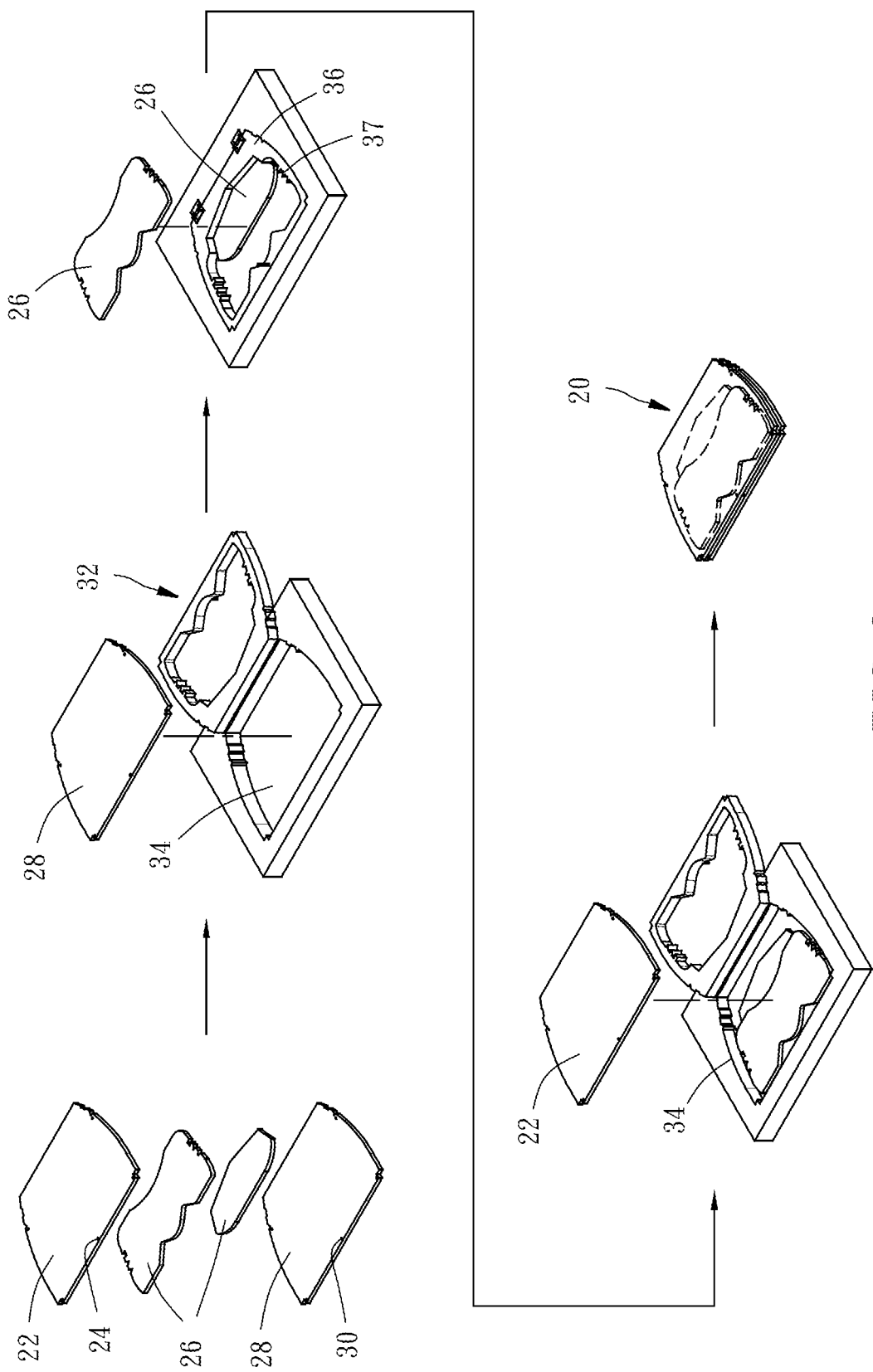
FIG. 3 is a schematic flow diagram for preparing a multilayer composite material in the heel cap manufacturing method of the present invention.

As shown in FIG. 3, a plurality of materials cut with specific shapes in advance are prepared. The aforementioned materials are an upper surface material 22, two middle materials 26 and a lower surface material 28. Then, the aforementioned materials are each applied on single or double surfaces thereof with glue, which means the bottom surface of the upper surface material 22, both the top and bottom surfaces of the two middle materials 26 and the top surface of the lower surface material 28 are applied with glue. Then, the upper surface material 22, the two middle materials 26 and the lower surface material 28 are combined by an auxiliary jig 32. Further speaking, the lower surface material 28 is firstly put into a recess 34 of the auxiliary jig 32, then a cover 36 is closed, then the two middle materials 26 are sequentially put into a positioning trough 37 of the cover 36 to be positioned, then the cover 36 is opened, and at last the upper surface material 22 is put into the recess 34 of the auxiliary jig 32. In this way, the lower surface material 28, the two middle materials 26 and the upper surface material 22 are sticked and fixed to each other, thereby formed into the multilayer composite material 20. In the end, the multilayer composite material 20 is taken out from the recess 34 and sent into a stove to be dried, making the glue solidified.

It should be additionally specified here that the upper surface material 22 may, but unlimited to, be made of Aerflex foam material provided on the surface thereof with drawn-texturing yarn (DTY). The two middle materials 26 may, but unlimited to, be made of Aerflex foam material. The lower surface material 28 may, but unlimited to, be made of Aerflex foam material provided on the surface thereof with net fabric. However, actually the above-described materials can be modified according to practical requirements. Besides, the upper surface material 22, the two middle materials 26 and the lower surface material 28 may be designed with various shapes and sizes according to practical requirements. There is unlimited to only two middle materials 26, and the amount may be increased from two to three or more than three according to practical requirements.

b) As the step S2 shown in FIG. 2, thermal press molding is performed to the multilayer composite material 20 by a thermal pressing device 38 to obtain a thermal pressed semi-product 46.

Figure 4:
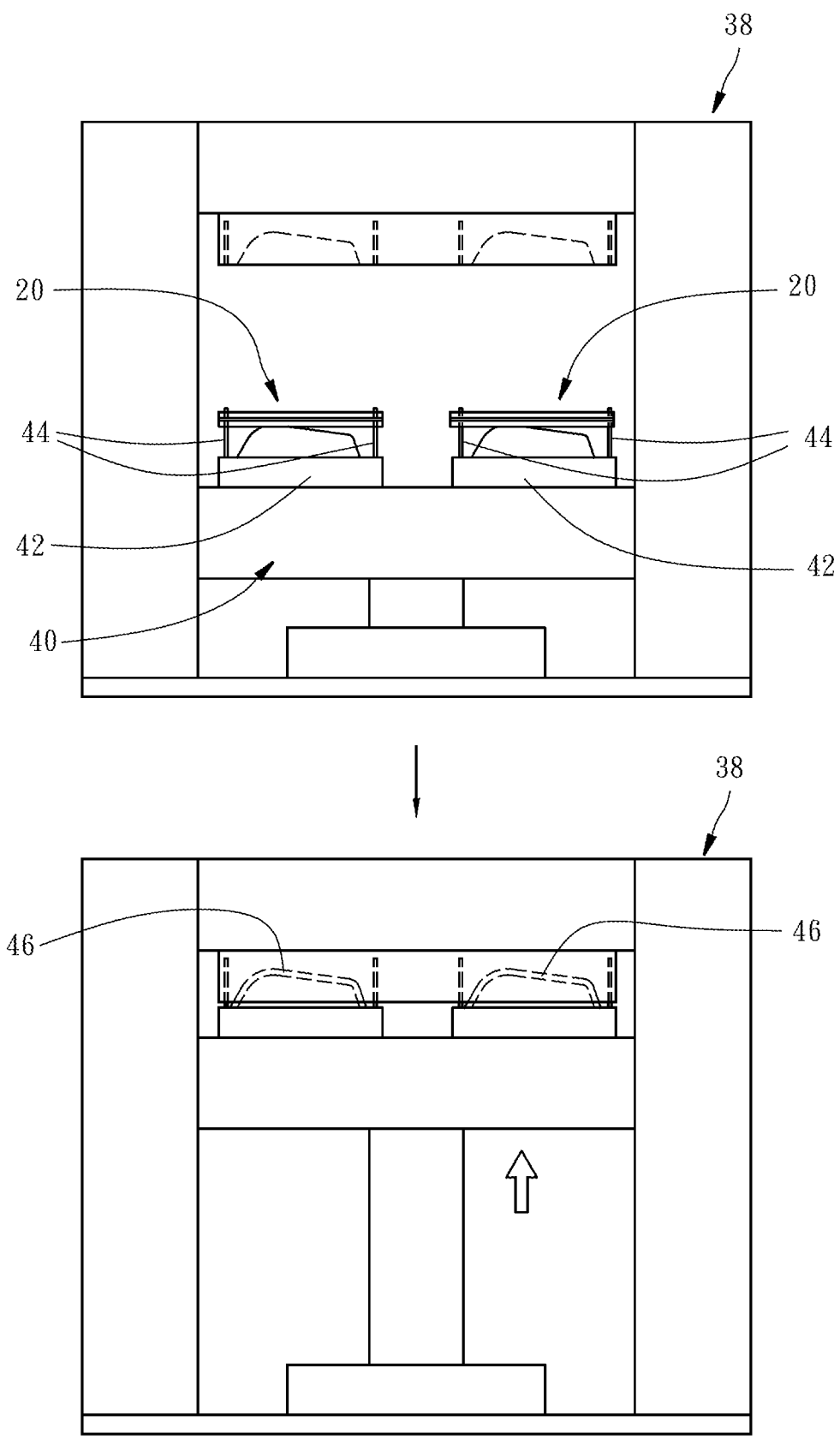
FIG. 4 is a schematic flow diagram for performing thermal press molding to the multilayer composite material in the heel cap manufacturing method of the present invention.

In this step, the multilayer composite material 20 is put into the thermal pressing device 38 manually. The thermal press molding is performed to the multilayer composite material 20 under a temperature ranged from 160° C. to 180° C. and a force of 50 KGS, and the heating and pressing time is approximately ranged from 150 seconds to 200 seconds. In this way, the thermal pressed semi-product 46 can be obtained, and this is the first time of molding. Secondly, as shown in FIG. 4, the thermal pressing device 38 is provided therein with a thermal pressing mold 40. A lower die 42 of the thermal pressing mold 40 has five positioning pillars 44. The upper surface material 22 and the lower surface material 28 are provided in advance with five upper positioning holes 24 and five lower positioning holes 30, respectively. When the multilayer composite material 20 is put on the lower die 42, the five positioning pillars 44 are inserted in the five upper positioning holes 24 and the five lower positioning holes 30 one to one, so that the multilayer composite material 20 can positively maintain positioned during the thermal press molding. It should be additionally specified here that the amount of the upper positioning holes 24, lower positioning holes 30 or positioning pillars 44 is unlimited to five, which may be increased or decreased according to practical requirements, as long as they can correspond in coordination with each other.

c) As the step S3 shown in FIG. 2, the thermal pressed semi-product 46 is taken out from the thermal pressing device 38, and then the thermal pressed semi-product 46 is fixed to a heel cap mold 48.

Figure 5:
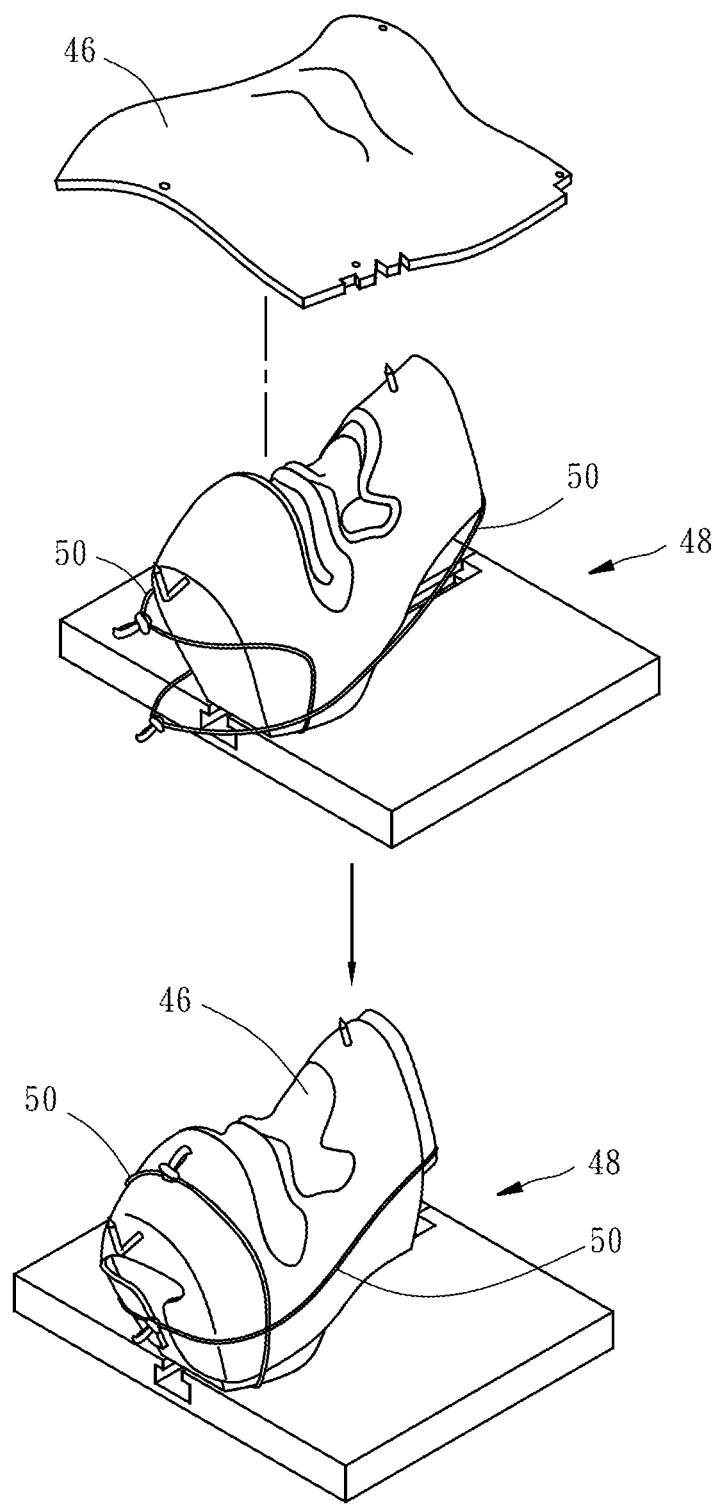
FIG. 5 is a schematic flow diagram for fixing a them pressed semi-product to a heel cap mold in the heel cap manufacturing method of the present invention.

As shown in FIG. 5, the thermal pressed semi-product 46 is taken out from the thermal pressing device 38 manually, and then the thermal pressed semi-product 46 is wrapped on the heel cap mold 48 and fixed by two elastic bands 50. In this step, the fixing manner by the two elastic bands 50 can avoid too deep impressions left on the thermal pressed semi-product 46 and thereby affecting yield. Of course, according to practical requirements, various manners, such as clamp, are optional for the fixing.

d) As the step S4 shown in FIG. 2, cold press molding is performed to the thermal pressed semi-product 46 together with the heel cap mold 48 in a cooling device 52 to obtain a cooled semi-product 54.

In this step, the thermal pressed semi-product 46 together with the heel cap mold 48 is put on a conveying device, such as but unlimited to roller or belt. The thermal pressed semi-product 46 and the heel cap mold 48 are conveyed together by the aforementioned conveying device toward the cooling device 52. When arriving where the cooling device 52 is located, the thermal pressed semi-product 46 together with the heel cap mold 48 is put into the cooling device 52 manually. The cold press molding is performed under a temperature ranged from 0° C. to 10° C., and the cooling time is about 240 seconds. In this way, the cooled semi-product 54 can be obtained, and this is the second time of molding. Besides, in this embodiment it primarily uses a refrigerator as the cooling device 52, which can raise the production capacity. More importantly, it is effective in lowering humidity and eliminating moisture, so as to avoid the problem that the residual moisture will cause the finished product to mildew easily.

e) As the step S5 shown in FIG. 2, the cooled semi-product 54 is demolded from the heel cap mold 48, and after it is rewarmed, the finished heel cap 12 is obtained.

In this step, the cooled semi-product 54 is demolded from the heel cap mold 48 manually, then sorted and packed according to size, and then the cooled semi-product 54 is rewarmed under a temperature ranged from 20° C. to 30° C. by one or a plurality of rewarming devices 56, and the rewarming time is about 900 seconds. In this way, the finished heel cap 12 can be obtained. Besides, the rewarming device 56 may, but unlimited to, be an air-drying machine or a thermal drying machine.

f) As the step S6 shown in FIG. 2, the edge of the heel cap 12 is cut and modified.

In this step, after the rewarming processing is finished, the excess edge material of the finished heel cap 12 is cut off by one or a plurality of edge trimming devices 58, and the edge is modified by cutting.

g) As the step S7 shown in FIG. 2, quality inspection is performed to every finished product by human labor or associated tools to ensure the quality. After passing the quality inspection, sorting and packing are performed according to size for the convenience of the follow-up shipment.

It can be known from the above-described manufacturing method that the present invention uses the processing manner of molding twice by cold and thermal pressing to manufacture the multilayer composite material 20 into the heel cap 12 relatively more complex in structure and functional. Compared with prior arts, the manufacturing method provided by the present invention can not only lower the difficulty of the manufacturing process and bring high stability so as to raise the product yield and the production efficiency, but also enable the diversity in appearance shaping.

What is claimed is:

1. A heel cap manufacturing method comprising the steps of:
    a) preparing a multilayer composite material;
    b) performing first press molding at a first temperature to the multilayer composite material by a thermal pressing device to obtain a thermal pressed semi-product;
    c) taking out the thermal pressed semi-product from the thermal pressing device and then fixing the thermal pressed semi-product to a heel cap mold;
    d) performing second press molding at a second temperature which is lower than the first temperature to the thermal pressed semi-product together with the heel cap mold in a cooling device to obtain a cooled semi-product; and
    e) demolding the cooled semi-product from the heel cap mold, and after it is rewarmed, obtaining a finished heel cap.

2. The heel cap manufacturing method as claimed in claim 1, wherein in the step d), a refrigerator is used as the cooling device.

3. The heel cap manufacturing method as claimed in claim 1, wherein in the step e), a rewarming device is used to rewarm the cooled semi-product.

4. The heel cap manufacturing method as claimed in claim 1, further comprising a step f) of cutting and modifying an edge of the finished heel cap after the step e).

5. The heel cap manufacturing method as claimed in claim 1, wherein in the step a), an auxiliary jig is used to press and stick a lower surface material, at least two middle materials and an upper surface material together in order, so as to form the multilayer composite material.

6. The heel cap manufacturing method as claimed in claim 5, wherein in the step a), the lower surface material, the at least two middle materials and the upper surface material are firstly applied on surfaces thereof with glue, and then combined into the multilayer composite material by the auxiliary jig.

7. The heel cap manufacturing method as claimed in claim 5, wherein in the step a), after the multilayer composite material is formed by the auxiliary jig, drying is performed to the multilayer composite material.

* * * * *